United States Patent [19]

Werner et al.

[11] 4,018,957

[45] Apr. 19, 1977

[54] COATED FABRIC SHEET-TYPE MATERIAL HAVING RESILIENT BACKING AND PROCESS FOR MAKING SAME

[75] Inventors: Jesse Werner, New York, N.Y.; Gordon R. Rugg, Allentown, Pa.

[73] Assignee: GAF Corporation, New York, N.Y.

[22] Filed: Apr. 1, 1975

[21] Appl. No.: 564,155

[52] U.S. Cl. .................. 428/141; 427/209; 427/381; 427/390 R; 427/412; 428/159; 428/160; 428/161; 428/162; 428/315; 428/320; 428/332; 428/246; 428/262; 428/286; 428/290

[51] Int. Cl.² .................. B32B 3/00; B32B 3/30

[58] Field of Search .......... 428/141, 172, 161, 162, 428/285, 289, 310, 320, 220, 246, 315, 332, 159, 160, 262, 286, 290; 427/209, 381, 390, 412; 264/45.1

[56] References Cited

UNITED STATES PATENTS

| | | | |
|---|---|---|---|
| 2,961,029 | 11/1960 | Rainar | 428/320 |
| 3,257,252 | 6/1966 | Keel | 428/310 |
| 3,360,422 | 12/1967 | Desch | 428/247 |
| 3,458,337 | 7/1969 | Rugg | 428/310 |
| 3,519,527 | 7/1970 | Crowley | 428/162 |
| 3,620,890 | 11/1971 | Kemmler | 427/209 |

*Primary Examiner*—George F. Lesmes
*Assistant Examiner*—P. J. Thibodeau
*Attorney, Agent, or Firm*—Walter C. Kehm; Joshua J. Ward

[57] ABSTRACT

Sheet-type covering material having a decorative fabric base with a wear layer over the face of the fabric and a resilient backing adhered to the back of the fabric is prepared by first forming a plastic wear layer adhered to the face of a sheet of decorative fabric and then forming a resilient backing layer on the back of the fabric sheet. Preferred embodiments include the use of mechanically foamed plastic as the resilient backing layer and a conventional wear layer of polyvinyl chloride or polyurethane. The fabric is preferably textured so as to impart a textured surface to the wear layer.

14 Claims, 2 Drawing Figures

COATED FABRIC SHEET-TYPE MATERIAL HAVING RESILIENT BACKING AND PROCESS FOR MAKING SAME

BACKGROUND OF THE INVENTION

This invention relates to a decorative sheet-type covering material and to a method for preparing such material.

Decorative sheet-type covering materials such as vinyl floor and wall coverings are well known in the art and various attempts have previously been made to impart decorative and textured characteristics to the surface of such materials. A number of processes have been suggested for this purpose. For instance, U.S. Pat. No. 3,458,337 to Rugg, the disclosure of which is incorporated herein by reference, suggests a method for producing a textured surface by employing a resin layer containing a catalyst activated foaming agent and then applying in selected pattern areas an agent for suppressing the catalytic action of the catalyst. It is also well known, as described in the Rugg patent, to achieve decorative designs on vinyl flooring by printing suitable designs on the surface of the flooring just under the wear layer. Rigid vinyl flooring material has also been marketed which comprises layers of plastic and aluminum foil on an asbestos felt backing and overlaid with smooth fabric to which is laminated a plastic wear layer. Flooring material has also been marketed which comprises non-woven fabric carrying a block printed design, covered with a urea formaldehyde top coat and laminated to non-resilient felt backing.

Various sheet-type covering materials have also been suggested which employ resilient backing materials. For instance, U.S. Pat. No. 2,629,678 to Thompson et al discloses a form of artificial leather which comprises a sponge rubber backing, a synthetic resin grained, embossed, etc. to resemble leather, and a layer of fabric between the resin and sponge rubber to alleviate problems previously encountered due to separation of the sponge rubber and resin layers. U.S. Pat. No. 3,002,868 to Boivin discloses a floor covering comprising a sheet of reinforcing glass fiber fabric with a polyvinyl chloride (PVC) facing and a foam rubber or vinyl foam backing. The PVC facing is provided with a conventional inlaid or printed design and may be conventionally textured to provide decorative effect. U.S. Pat. No. 3,360,422 to Desch discloses a similar material, except that an extremely open weave fabric is used to eliminate problems in connection with delamination of the material described in the Boivin patent. In none of these patents is the fabric visible from the surface of the finished covering, nor is there any suggestion of the use of fabric to obtain a decorative or textured effect in conjunction with a resilient backing material.

SUMMARY OF THE INVENTION

It is, accordingly, an object of the invention to provide decorative sheet-type covering material such as sheet vinyl floor or wall covering product which combines the decorative advantages of a fabric which can be seen through the wear layer of the covering with the advantages of a resilient backing material for the covering. It is a further object of the invention to provide a decorative, resilient backed, sheet-type covering material having a wear layer with a textured surface due to the presence of a textured fabric forming part of the covering.

In accordance with the invention, a flexible, decorative sheet-type covering material is provided which has a decorative fabric base, a resilient backing layer adhered to the back of the fabric and a transparent plastic wear layer adhered to the face of the fabric and through which the decorative effect of the fabric is visible. The fabric base is preferably a textured fabric and the outer surface of the wear layer preferably has a height variation due to the texture of the fabric of at least about 4 mils. The resilient backing material preferably comprises a layer of foamed material such as mechanically foamed PVC and preferably has a density between about 10 and about 40 lbs. per cubic foot. ($lb/ft^3$), more usually between about 15 and about 25 $lb/ft^3$. Suitable thicknesses of the various layers of the product of the invention include a wear layer between about 5 and about 20 mils thick, fabric having a weight between about 6 to about 20 ounces per square yard ($oz/yd^2$) and a resilient backing layer between about 50 and about 250 mils thick. Depending upon the particular materials used, it may also be desired to include a transparent latex seal or size coat between the fabric and the wear layer. A seal coat may also be employed, if desired, between the resilient backing layer and the fabric to aid in adhesion of the backing layer to the fabric.

A process is also provided for making decorative sheettype covering material of the invention. The process comprises forming a transparent plastic wear layer adhered to the face of a sheet of decorative fabric whereby the fabric is visible through the wear layer and forming a resilient backing layer on the other side of the fabric sheet. In general, the same materials mentioned above in connection with the product of the invention are preferred for use in practicing the process of the invention. In a preferred embodiment, the process of the invention involves coating the face of the sheet of decorative textured fabric with a transparent latex emulsion seal coat which is then dried. A transparent wear layer of PVC plastisol or organosol is then applied over the seal coat and gelled, preferably by pressing the thus coated fabric against a heated chrome drum to gel the surface of the wear layer. The wear layer is then cured and a backing layer of mechanically foamed PVC plastisol or organosol is applied to the back of the coated fabric and heated sufficiently for curing thereof.

DETAILED DESCRIPTION OF THE INVENTION

Figure 1:
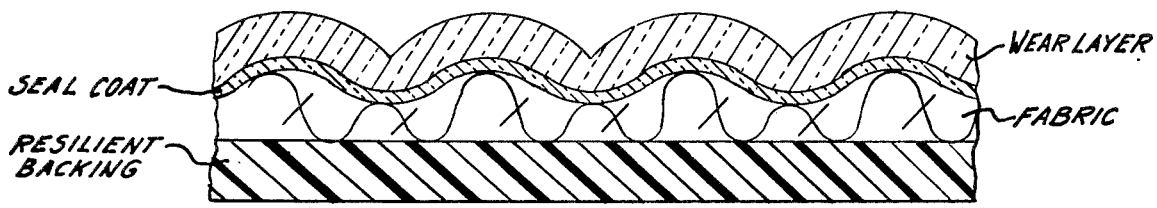
FIG. 1 is a fragmentary sectional view through a preferred covering material of the invention. In this view it is not intended that the thickness of the various layers of the product shown be precisely represented. Rather, the various layers are represented on an exaggerated scale and without showing precise relationships between the thicknesses of the layers.
Figure 2:
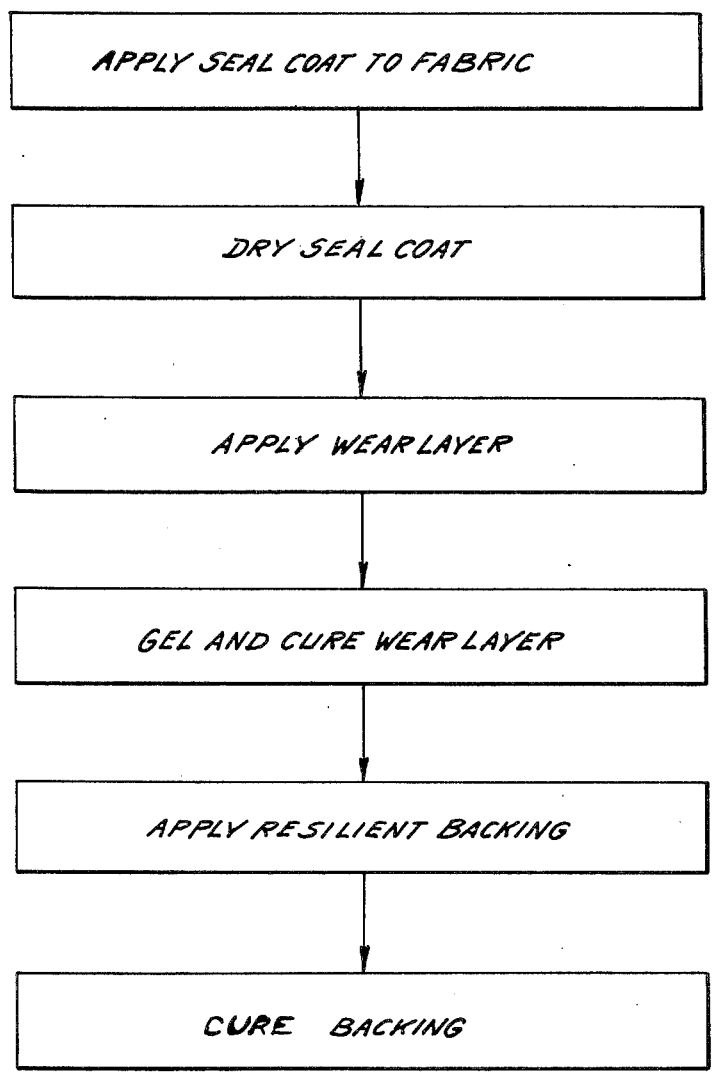
FIG. 2 is a flow sheet diagram representing a preferred process for making the product depicted in FIG. 1.

As mentioned above, the product of the invention is a flexible, decorative sheet-type covering material comprising a decorative fabric base, a transparent plastic wear layer adhered to the face of the fabric and through which the fabric is visible and a resilient backing layer adhered to the back of the fabric. While almost any fabric is suitable as a base, relatively closely woven fabric having a weight of between about 6 and about 20 oz/yd$^2$, more usually between about 8 and about 12 oz/yd$^2$ is preferred. Since one of the prime objectives of the invention is to provide a decorative covering material with the decoration being provided by the fabric, the fabric should, of course, be decorative, i.e. have a decoration printed thereon or imparted thereto by other means such as colored yarn. Particularly good results are obtained when yarn of different colors is used to provide at least part of the decorative effect. In this respect textured fabrics, i.e. those having some portions raised higher than others are highly preferred and in accordance with a preferred embodiment of the invention, the fabric is textured with a height variation due to the texture of between about 2 and about 16 mils. The fabric may be made of any suitable natural or synthetic material such as cotton, wool, rayon, polyester materials, etc. Depending upon the particular materials and operating conditions used, the amount of certain synthetic materials used in the fabric may have to be limited to avoid undesirable softening or melting of the fabric during formation of the finished product as described below. As mentioned, decorative effects may be achieved by conventional means such as the use of varying colors of fibers, weaving techniques, printing of designs on fabrics, the use of textured fabrics such as brocades or a combination thereof.

The use of a seal or prime coat over the fabric is not considered essential but is preferred to prevent strike through of the wear layer and to improve adhesion of the wear layer to the fabric. If desired, a seal coat may also be used on the back of the fabric to prevent discoloration of the fabric by plasticizers present in some of the preferred types of resilient backing layers to be discussed below. Where used, the seal coats may comprise any of the materials conventionally used for such purposes, for example, a latex containing an acrylic polymer with or without fillers such as the prime coat described in U.S. Pat. No. 3,458,337 to Rugg. The seal coat on the face of the fabric should, of course, be sufficiently transparent so that such decorative effects may show through the seal coat and the wear layer.

The plastic wear layer adhered to the face of the fabric (i.e. the surface of the fabric bearing the desired decorative effect) may be any of the flexible wear layers known to the flooring art but is preferably a PVC or polyurethane wear layer. Such PVC plastic may be any of the various PVC resin materials normally used in connection with coating of decorative sheet materials and may specifically include but are not limited to those described in the above-mentioned U.S. Pat. No. 3,458,337. Again, it is considered essential that the wear layer be sufficiently transparent, so that colors or designs of the fabric are visible. Multiple wear layers may also be used with one or more wear layers being colored in a conventional manner. Total wear layer thickness is preferably between about 5 and about 20 mils. If smooth rather than textured fabric is used, then one or more wear layers may be printed in a conventional manner.

The resilient backing layer, which is an essential component of the product of the invention, may comprise any suitable material such as foamed natural or synthetic latex, PVC plastisol or organosol, polyurethane or other resilient material such as fibrous material, eg. wool felt impregnated with natural or synthetic latex. The density of the resilient backing may vary widely, but where a layer of foamed material is used as in preferred embodiments of the invention, density is preferably between about 10 and about 40 lbs. per cubic foot. The thickness of the resilient backing will be determined by the degree of resiliency desired and the particular material employed, but frequently will range from about 50 to about 250 mils. Preferred resilient materials are foamed plastic materials, especially foamed PVC. Such material can be formed in any suitable manner such as by chemical or mechanical foaming. The particular foaming technique selected for individual applications may vary depending upon the other materials being used in forming the product of the invention, the thickness of the foam layer desired, etc. For instance, in forming chemically blown foams, resin and plasticizer combinations should be selected so that the fusion rate of the plastisol is balanced with the evolution of gas from the blowing agent. Chemical foaming can generally be carried out according to the techniques described in the above-mentioned U.S. Pat. No. 3,458,337 or other techniques well known in the art using conventional blowing agents such as azodicarbonamide, N,N' Pentamethylene Tetramine, p-toluene Sulfonylsemicarbazide, etc. and, where appropriate conventional blowing agent catalysts such as zinc organic compounds.

While chemically blown foam may, as described above, be utilized as the resilient backing layer of the invention, the preferred backing layer is mechanically foamed material which is applied to the reverse side of the fabric as a foam and subsequently cured. Any of the various foamed latex materials known in the art may be used. For instance, U.S. Pat. No. 3,607,341, the disclosure of which is incorporated herein by reference, discloses foamed material made from compositions comprising a mixture of a polymerized natural or synthetic latex emulsion with suitable water soluble surfactant such as a soap emuslifier or detergent. Preferred materials include vinyl plastisols or organosols, especially polyvinyl chloride and polyvinyl acetate organosols or plastisols containing silicone surfactants. These can be frothed by conventional techniques such as air whipping to incorporate air to the extent necessary to obtain desired densities. More complete discussions of conventional techniques for forming mechanically foamed material may be found in various publications such as "A Guide for Making PVC Foamed Plastisols Without Blowing Agents" by Jack W. Web appearing in the SPE Journal, February, 1971 and the booklet entitled "Mechanically Frothed Vinyl Foams Using Silicone Surfactants" published by Dow Corning Corporation. In addition to resins and surfactants such as those mentioned, mechanically formed foam material of the type preferred in the present invention will also include conventional plasticizers and may optionally include other ingredients such as whiting, light and heat stabilizer, mineral spirits, etc. Suitable plasticizers include, for instance, dihexylphthalate, diisononylphthalate, butylbenzylphthalate, and others well known in the art. Air can be incorporated by any suitable techniques such as use of conventional Oaks or Hobart mixers.

Silicone surfactants for use in forming mechanically foamed material suitable for the invention include those described in detail in U.S. Pat. No. 3,511,788, the disclosure of which is incorporated herein by reference. These may be described generally as compolymers of $SiO_2$ units and units selected from the group consisting of $(CH_3)_3SiO_1/2$ and $Q(CH_3)_2SiO_1/2$ units wherein Q is a radical containing a solubilizing group and the ratio of $SiO_2$ units to the total $(CH_3)_3Si$ and $Q(CH_3)_2Si$ units is in the range of 1:0.6 to 1:1.2.

In the preferred embodiment of the invention in which the texture of the fabric is relied upon to supply at least a portion of the decorative effect in the finished product, the fabric preferably has a texture with a height variation of at least about 4 mils, usually between about 4 and about 16 mils. By height variation is meant the difference (with the fabric in a horizontal position) between the lowest points and the highest points on the upper surface or face of the fabric. Using textured fabric meeting these requirements and a wear layer between about 8 and about 12 mils thick, it is possible and desirable to produce a finished product in which the surface of the wear layer has a textured appearance with the texture corresponding to the texture of the fabric and in which the height variation of the surface of the wear layer due to the texture of the fabric is at least about 4 mils. For this embodiment of the invention, the thickness of the wear layer should be taken to include the thickness of any seal coat used over the face of the fabric.

As mentioned above, the basic process of the invention involves formation of a plastic wear layer adhered to the face of a sheet of decorative fabric and formation of a resilient backing layer on the back of the fabric sheet. The plastic wear layer may be applied and cured in a conventional manner using conventional materials as discussed above. The wear layer may be adhered directly to the face of the fabric or, as mentioned above, a seal coat may be used to aid in adhering the wear layer to the fabric. The wear layer may be adhered to the fabric by laminating or by coating in accordance with the usual techniques used in coating of wear layers onto sheet vinyl flooring materials. In a preferred embodiment of the invention the wear layer comprises a transparent layer of PVC plastisol or organosol and is applied to the fabric by coating followed by pressing of the fabric onto a heated chrome drum at a temperature between about 290° and about 310° F to gel the wear layer. A pressure between about 20 and about 50 lbs. per linear inch of roll nip is preferably used. Under these conditions, where a textured fabric is used, the textured surface of the fabric is temporarily smoothed by the roll or drum so that the wear layer is of a relatively uniform thickness and has a relatively flat surface when the sheet is stripped from the drum. A further advantage of setting or gelling the wear layer against a chrome drum is that the surface of the finished wear layer mirrors the chrome plating so that a high gloss finish may be obtained. The raised portions of the textured fabric, which have been temporarily smoothed, spring back to some extent when the sheet is stripped from the drum, but spring back even more during initial curing of the wear layer, so that after curing, the wear layer follows the original contour of the fabric texture to thereby produce a finished product having a textured surface. (As used herein the term "curing" is intended to refer to fusing of materials such as PVC plastisol or organosols as well as to true chemical curing of material such as polyurethane.) This tendency of the raised portions of the textured fabric to recover substantially their original height only during the initial stages of curing of the wear layer is not fully understood but is believed to be due to the fact that in the curing process, the wear layer first softens, thereby allowing the compressed portions of the fabric to rebound or spring back, before completion of the curing step. As in conventional curing of floor covering wear layers, curing temperatures and times may vary depending upon the particular materials employed but will frequently range between about 325° and about 400° F for periods of time ranging between about 2 and about 4 minutes. Generally speaking, curing takes place in relatively shorter times at relatively higher temperatures.

Where it is desired to laminate the wear layer onto the fabric, this may also be done in a conventional manner. For instance, a suitable wear layer may be coated in the desired thickness on release paper and gelled. The gelled wear layer may then be transferred to a hot chrome drum by pressing the coated release paper against the drum at a suitable pressure such as between about 20 and about 50 lbs. per linear inch of drum at a drum temperature between about 290° and about 310° F. The wear layer adheres to the drum and the release paper may be stripped away. The seal coated fabric may then be laminated to the wear layer by passing it against the drum under somewhat higher pressures such as between about 40 and about 60 lbs. per linear inch with the face of the fabric against the wear layer on the drum. This laminates the wear layer to the fabric and the fabric, complete with laminated wear layer, may then be stripped from the drum. The wear layer may then of course be cured in a suitable manner.

The resilient backing layer may also be applied to the fabric in any conventional manner such as by laminating or by coating as with a knife coater. In a preferred embodiment the backing material is preferably first foamed and then applied to the fabric by coating thereon in a conventional manner to the desired thickness of between about 50 and about 250 mils. As mentioned above, a seal coat may be applied if desired between the fabric and the backing layer to prevent migration of plasticizer from the backing layer to the fabric. Such seal coat where used may, of course, be applied in a conventional manner prior to application of the resilient backing. Following application of the foam to the fabric, the foam is cured in a suitable manner. In the case of foamed vinyl backing of the type mentioned above as being preferred, such curing may conveniently be accomplished by exposure at temperatures between about 250° and about 320° F in a forced draft oven for periods of time between about 8 and about 20 minutes.

Where the resilient backing material is applied by laminating, this may be done in a conventional manner such as by the use of release paper. One suitable method for applying a laminated resilient backing involves coating release paper with a layer of foam. This may either be chemically blown or mechanically foamed material which is then suitably cured. The back of the fabric is then coated with a suitable adhesive which is dried as needed and the foam is then stripped from the release paper and laminated to the adhesive coated fabric by application of suitable pressures such as pressures between about 20 and about 50 lbs. per linear inch. If desired, the cured foam rather than the back of the fabric can be coated with adhesive, but better results are obtained when the adhesive is placed on the fabric.

Material of the present invention is suitable for a number of uses such as flooring, wall coverings, etc. The combination of decorative fabric appearance combined with resilient backing obtainable in practicing the invention provides a unique soft goods appearance combined with resiliency and sound deadening properties for flooring or wall covering. This combination of properties is unobtainable by previous printing and texturing techniques. A further advantage is improved puncture resistance because of the relatively puncture proof fabric layer. The resilient backing provides both insulating and sound deadening properties and the wear layer provides resistance to gouging, scratching, staining and ease of maintenance.

The following examples will illustrate preferred embodiments of the invention.

EXAMPLE I

In this Example a woven unholstery fabric (9.5 oz-/yd$^2$) having a textured design with a height variation of 6 mils is first coated with a 2 mil thick wet latex seal coat of 50 wt. % solids. The seal coat may be a thickened acrylic latex prepared by adding six parts of an acid containing cross-linked acrylic emulsion copolymer (50% water) to 100 parts of an acrylic copolymer emulsion consisting of 40 weight percent ethylacrylate and 60 weight percent methylmethacrylate. The seal coat is applied using a No. 40 wire wound doctor blade and is dried for 5 minutes at 285° F in a force draft oven.

Following application and drying of the seal coat, the fabric is coated with a clear wear layer applied by a knife coater to a final coating thickness varying between 13 mils in the lower areas of the fabric texture to 7 mils in the higher areas of the fabric texture. The height variation in the surface of the final coating is 5 mils. The following formulation may be used for the clear wear layer:

| | Parts by Weight |
|---|---|
| PVC/PVA (Polyvinyl Acetate) copolymer dispersion resin of 2.5 R.V. (Relative Viscosity) | 100 |
| 2,2,4-trimethyl pentanediol isobutyrate benzoate plasticizer | 56 |
| calcium-zinc light and heat stabilizer | 5 |
| epoxydized soya oil | 6 |
| mineral spirits | 3 |
| alkylphenyl ether of polyethylene glycol | 1 |

After the clear wear layer is applied it is set against a hot (300° – 310° F) chrome drum by passing the coated fabric into the nip between a rubber backup roll and the chrome drum using 36 lbs. per linear inch nip pressure. The coated fabric is stripped from the chrome drum after 2 seconds contact time and placed in a forced draft oven for three minutes at 355° F to fuse the wear layer.

Following application of the wear layer as described above, a 100 mil thick layer of mechanically foamed vinyl backing is applied to the reverse side of the fabric with a knife coater and is cured in a forced draft oven for 10 minutes at 275° F. The backing material is foamed in an Oaks continuous mixer and has a density of 20 lbs. per cubic foot. The backing material has the following composition:

| | Parts by Weight |
|---|---|
| PVC/PVA copolymer dispersion resin (2.5 R.V.) | 60 |
| PVC suspension resin (2.2 R.V.) | 40 |
| dihexylphthalate | 60 |
| diisononylphthalate | 20 |
| whiting (CaCO$_3$) | 20 |
| calcium-zinc stabilizer | 1 |
| mineral spirits | 5 |
| silicone surfactant (Dow 1250) | 4 |

EXAMPLE II

In this example the face of a woven, untextured fabric (15 oz/yd$^2$) having a colored design is coated with a seal coat as described in Example I and is then topcoated with a clear wear layer having a thickness of 10 mils and the following composition:

| | Parts by Weight |
|---|---|
| PVC homopolymer dispersion resin (3.4 R.V.) | 50.0 |
| PVC homopolymer suspension resin (2.1 R.V.) | 50.0 |
| dihexylphthalate plasticizer | 58.0 |
| epoxydized soya oil | 6.0 |
| mineral spirits | 3.0 |
| calcium-zinc stabilizer | 5.0 |

After curing of the wear layer as described in Example I, 150 mils of mechanically foamed backing material are coated onto the back of the fabric and cured by exposure in an air oven for 15 minutes at 275° F. In this example the foam has a density of 20 lbs. per cubic foot and the following formulation:

| | Parts by Weight |
|---|---|
| PVC/PVA copolymer dispersion (2.5 R.V.) | 60 |
| PVC homopolymer suspension resin (2.2 R.V.) | 40 |
| whiting | 20 |
| dioctylphthalate | 80 |
| mineral spirits | 5 |
| silicone surfactant (Dow 1250) | 4 |

EXAMPLE III

In this example a smooth, untextured fabric weighing 6 ozs. per square yard may be formed into a suitable product of the invention by laminating both a clear wear layer and a resilient backing layer to the fabric. The wear layer in this instance is the same wear layer used in Example I and the resilient backing layer is wool impregnated with neoprene latex. A seal coat similar to that used in Example I may be employed and an adhesive layer comprising 1% polymethyl vinyl ether in an acrylic latex copolymer may be used to adhere the backing layer to the back of the fabric. The adhesive is first coated on the back of the fabric, then dried for 5 minutes at 285° F, after which the backing material is laminated to the adhesive-coated fabric by passing through pressure rolls at 30 lbs. per linear inch pressure.

EXAMPLE IV

In this example the product and method of preparation are generally the same as in Example I except that a chemically foamed rather than a mechanically foamed backing material is used. In this example, after the seal coat and wear layer have been applied and the wear layer has been gelled, a 22 mil thick layer of foamable backing material is applied to the back of the fabric using a reverse roll coater and the fabric is then exposed to a temperature of 355° F for 2½ minutes in a forced draft oven to foam the backing layer and cure the backing and wear layers. The final thickness of the backing layer is 65 mils. The backing layer in this example has the following composition:

|  | Parts by Weight |
|---|---|
| PVC homopolymer dispersion resin (2.05 R.V.) | 50 |
| PVC homopolymer suspension resin (2.2 R.V.) | 50 |
| epoxydized soya oil | 6 |
| dihexylphthalate plasticizer | 58 |
| zinc octoate catalyst | 2.5 |
| $TiO_2$ | 7.5 |
| ABFA blowing agent | 2.5 |

EXAMPLE V

In this example an upholstery fabric weighing 12 ozs. per square yard is provided with a laminated wear layer of the same composition as the wear layer used in Example I and a laminated resilient backing of the same mechanically foamed backing material used in Example II. In forming the product the face of the fabric is first seal coated in the manner described in Example I and the wear layer is coated on release paper to a thickness of 10 mils and gelled for 2½ minutes at 275° F. The gelled wear layer is then transferred to a hot chrome drum by pressing the wear layer against the drum at a pressure of 36 lbs. per linear inch using a drum temperature of 300° F. The release paper is then stripped away leaving the wear layer adhered to the drum. Seal coated fabric is then passed against the drum with a pressure of 48 lbs. per linear inch to laminate the wear layer to the face of the seal coated fabric and the coated fabric is then stripped from the drum. In a separate operation, a 120 mil thick layer of the mechanically foamed backing material of Example II is cast on release paper and fused by exposure to a temperature of 355° F for a period of 3 minutes. The back of the fabric carrying the gelled, laminated wear layer is coated with the same pressure-sensitive adhesive used in Example III. The foam backing is then stripped from the release paper and laminated to the adhesive coated fabric by passage through pressure rolls at 30 lbs. per linear inch pressure.

While the invention has been described with respect to preferred embodiments thereof, it will be understood by those skilled in the art that various changes and modifications can be made without departing from the spirit or scope of the invention.

EXAMPLE VI

In this example the materials used and procedures followed are the same as the Example I except that the backing layer is a 125 mil thick layer of foamed styrene/butadiene latex.

EXAMPLE VII

In this Example the materials used and procedures followed are the same as in Example I except that the backing layer is a 100 mil thick layer of foamed polyurethane.

What is claimed is:

1. A flexible, decorative sheet-type covering material comprising:
    a. a decorative textured fabric base, said fabric having a height variation between about 4 and about 16 mils;
    b. a transparent, flexible polyurethane or PVC wear layer at least about 4 mils thick adhered to the face of the fabric and having a surface height variation of at least about 4 mils due to the texture of the fabric; and
    c. a resilient backing layer of foamed material between about 50 and about 250 mils thick and having a density between about 10 and about 40 lbs/ft$^3$ adhered to the back of the fabric.

2. The material of claim 1 in which the layer of foamed material comprises foamed polyvinyl chloride.

3. The material of claim 1 including a transparent latex seal coat between the fabric and the wear layer.

4. The material of claim 1 in which the fabric has a weight of between about 6 and about 20 oz/yd$^2$ and the wear layer is between about 5 and about 20 mils thick.

5. The material of claim 1 in which the layer of foamed material comprises foamed polyurethane.

6. The material of claim 1 in which the layer of foamed material comprises foamed latex.

7. The material of claim 1 in which protuberances on the upper surface of the wear layer correspond to protuberances in the texture of the fabric.

8. A process for making a flexible, decorative sheet-type covering material which comprises:
    a. forming a transparent, flexible, polyurethane or PVC wear layer at least about 4 mils thick adhered to the face of a sheet of decorative textured fabric having a height variation between about 4 and about 16 mils, the surface of the wear layer having a height variation due to the texture of the fabric of at least about 4 mils; and
    b. forming a resilient layer of foamed material between about 50 and about 250 mils thick and having a density between about 10 and about 40 lb/ft$^3$ adhered to the back of the fabric sheet.

9. The process of claim 8 in which the foamed material is mechanically foamed plastic having a density between about 10 and about 40 lbs/ft$^3$.

10. The process of claim 8 in which the foamed plastic is foamed PVC.

11. The product produced by the process of claim 8.

12. The process of claim 8 in which protuberances on the upper surface of the wear layer correspond to protuberances in the texture of the fabric.

13. A process for making a flexible, decorative sheet-type covering material which comprises:
    a. coating the face of a sheet of decorative textured fabric having a height variation between about 4 and about 16 mils with a transparent latex emulsion seal coat between about 2 and about 5 mils thick and drying said seal coat;
    b. applying a transparent PVC plastisol or organosol wear layer having a thickness of at least about 4 mils over said seal coat and gelling said wear layer without curing same;

c. heating the thus coated fabric to a temperature sufficient to cure the wear layer, the surface of the cured wear layer having a height variation of at least about 4 mils due to the texture of the fabric;

d. applying a foam backing layer of mechanically foamed PVC between about 50 and about 250 mils thick and having a density between about 10 and about 40 lb/ft$^3$ to the coated fabric; and e. heating the coated fabric sufficiently to cure the foam backing layer.

14. The process of claim 13 in which the wear layer is gelled by pressing the fabric coated therewith onto a heated chrome drum at a temperature between about 290° and about 310° F and a pressure between about 20 and about 50 lbs. per linear inch, whereby the textured surface of the fabric is temporarily smoothed by the drum so that the wear layer has a relatively uniform thickness and a relatively flat surface when the sheet is stripped from the drum with the fabric texture subsequently springing back during curing of the wear layer so that the wear layer will maintain a relatively uniform thickness of at least about 4 mils and follow the original contour of the fabric texture to thereby produce a finished wear layer having both a relatively uniform thickness of at least about 4 mils and a textured surface having a height variation of at least about 4 mils due to the texture of the fabric.

* * * * *